Inventors
Charles P. Cardani
Leland A. Cole
Andrew Eppler, Jr.
By their Attorney Carl E. Johnson Feb. 7, 1961  C. P. CARDANI ET AL  2,970,371
ARTICLE HANDLING AND INSTALLING MACHINES
Filed Feb. 26, 1958  15 Sheets-Sheet 5

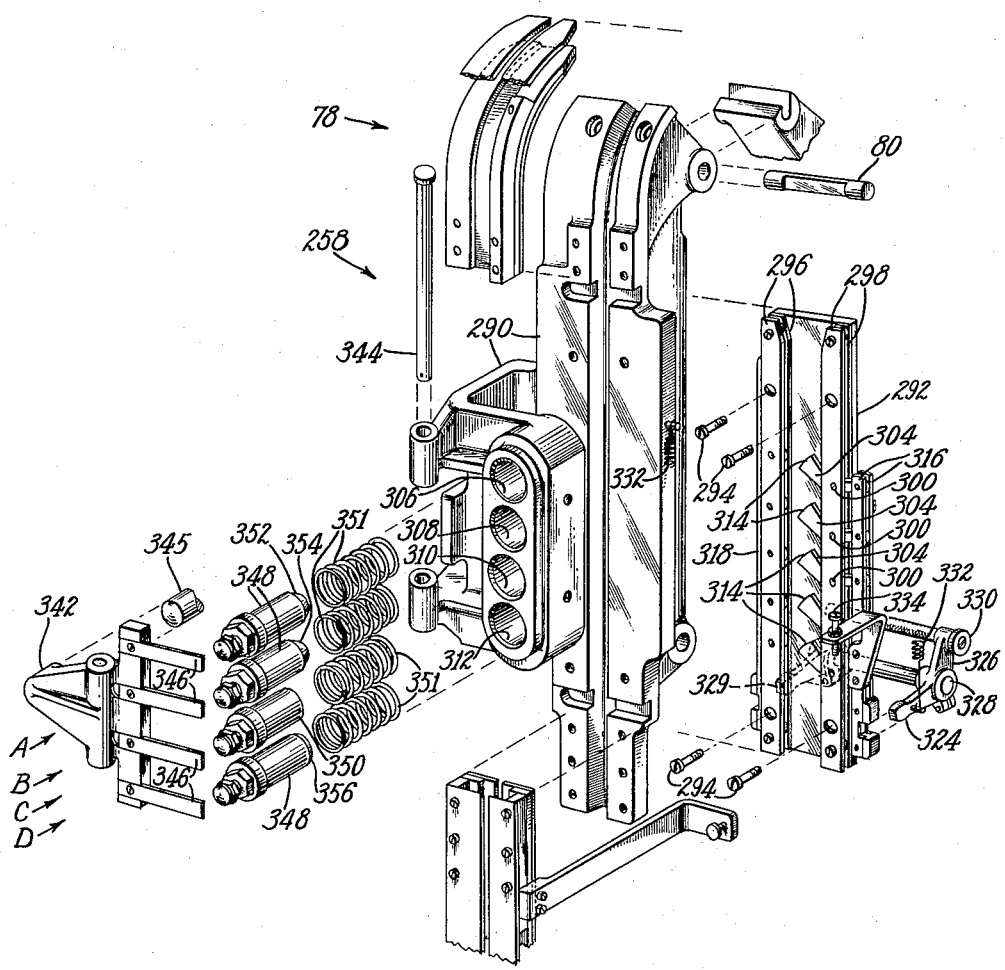

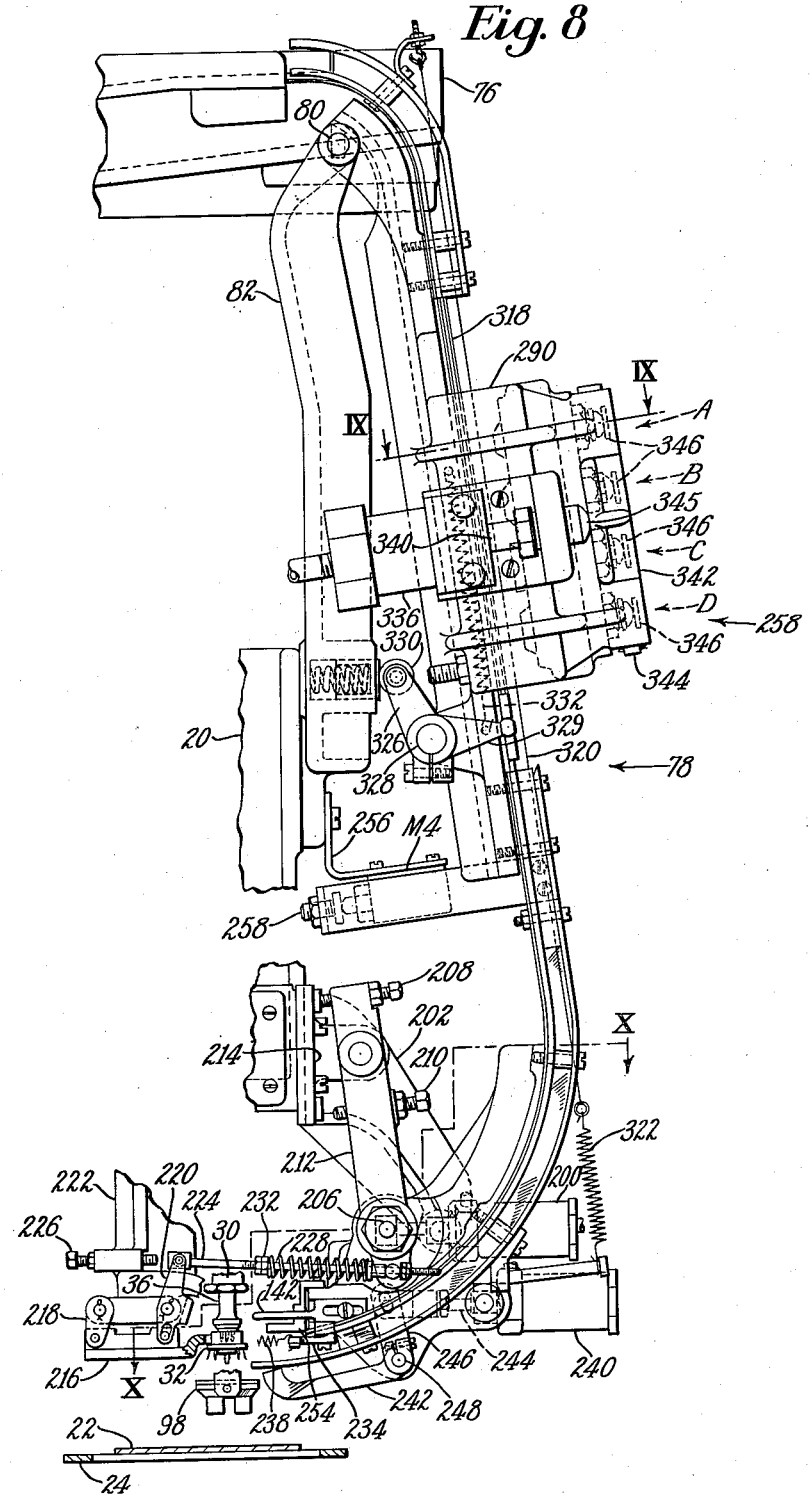

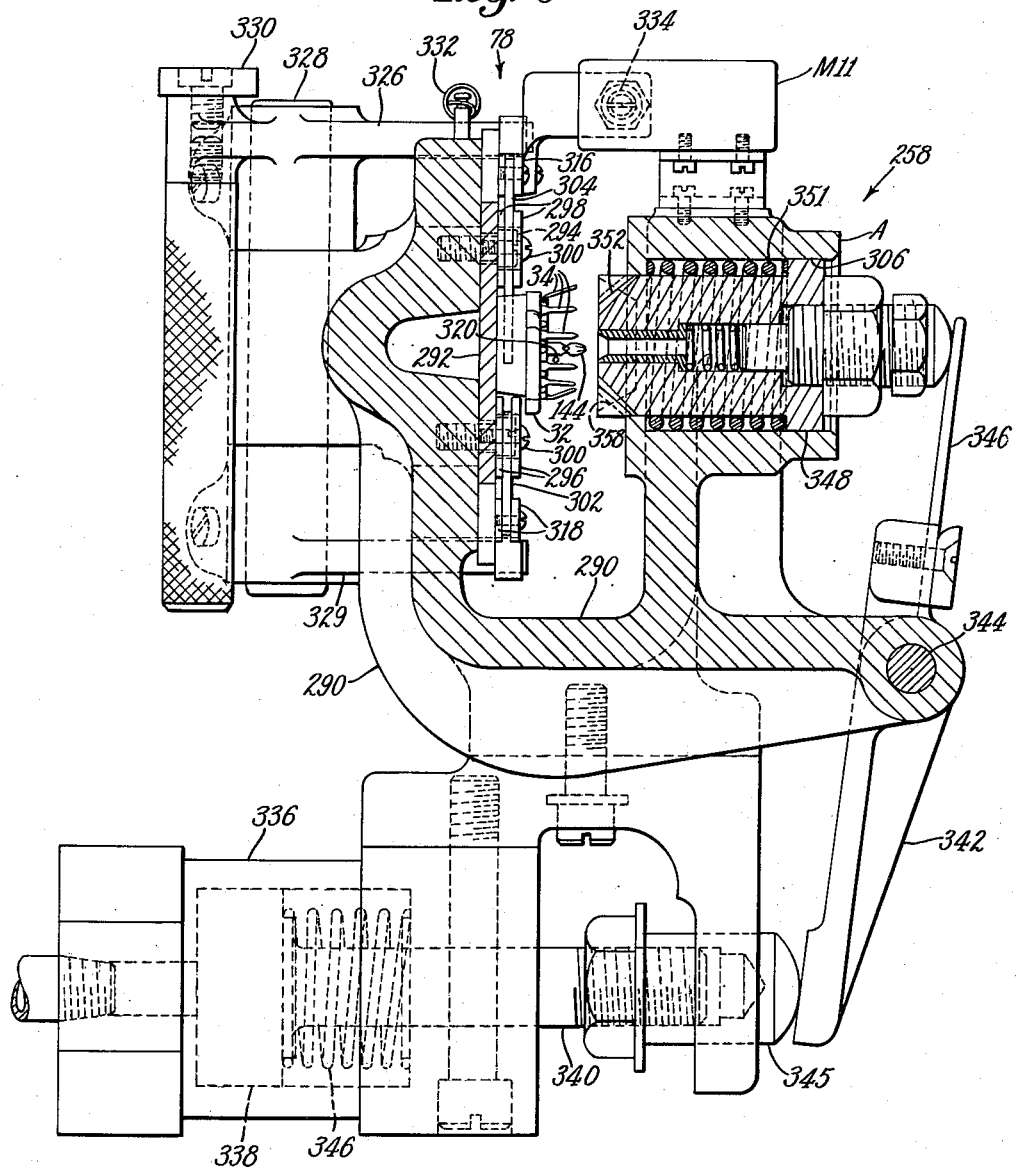

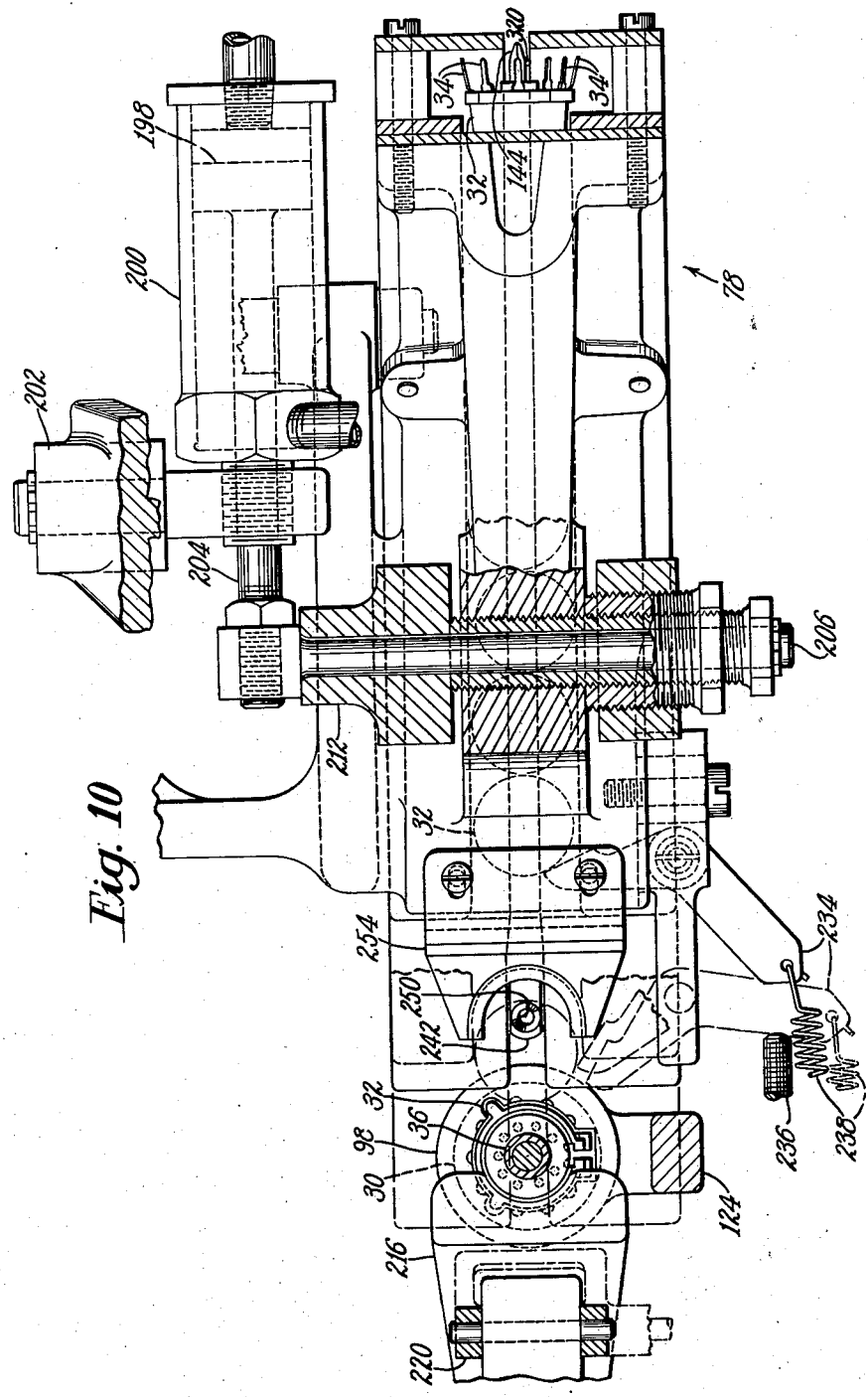

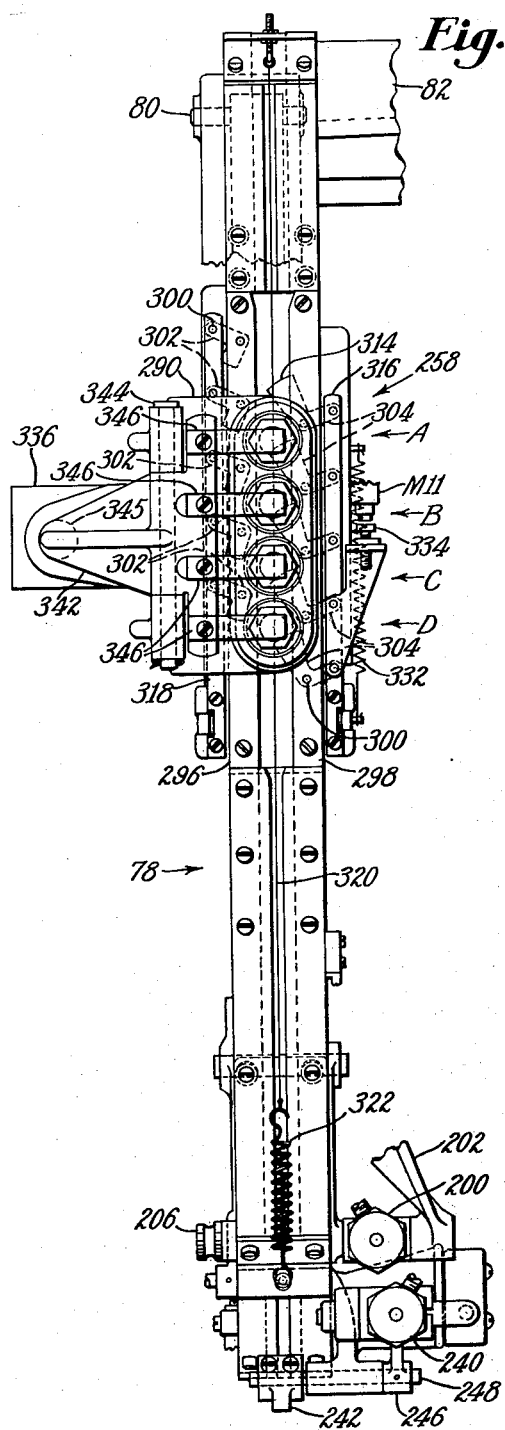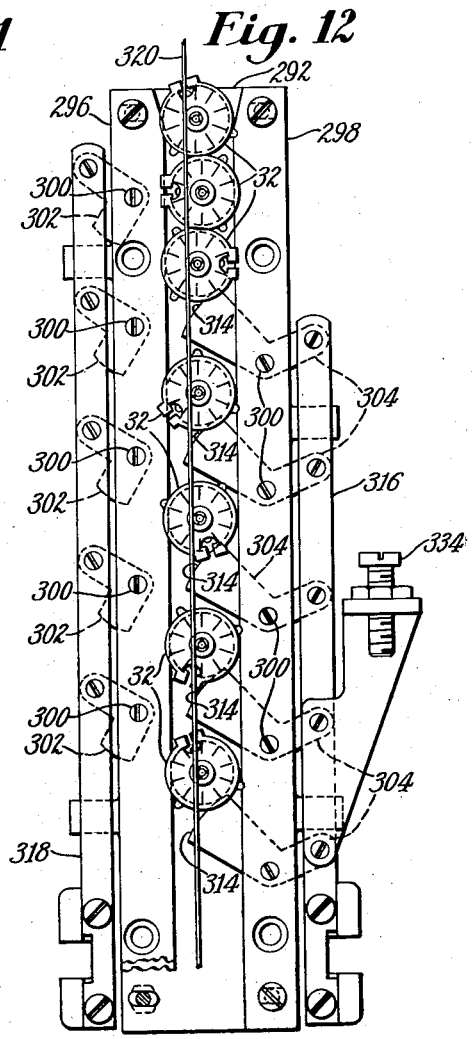

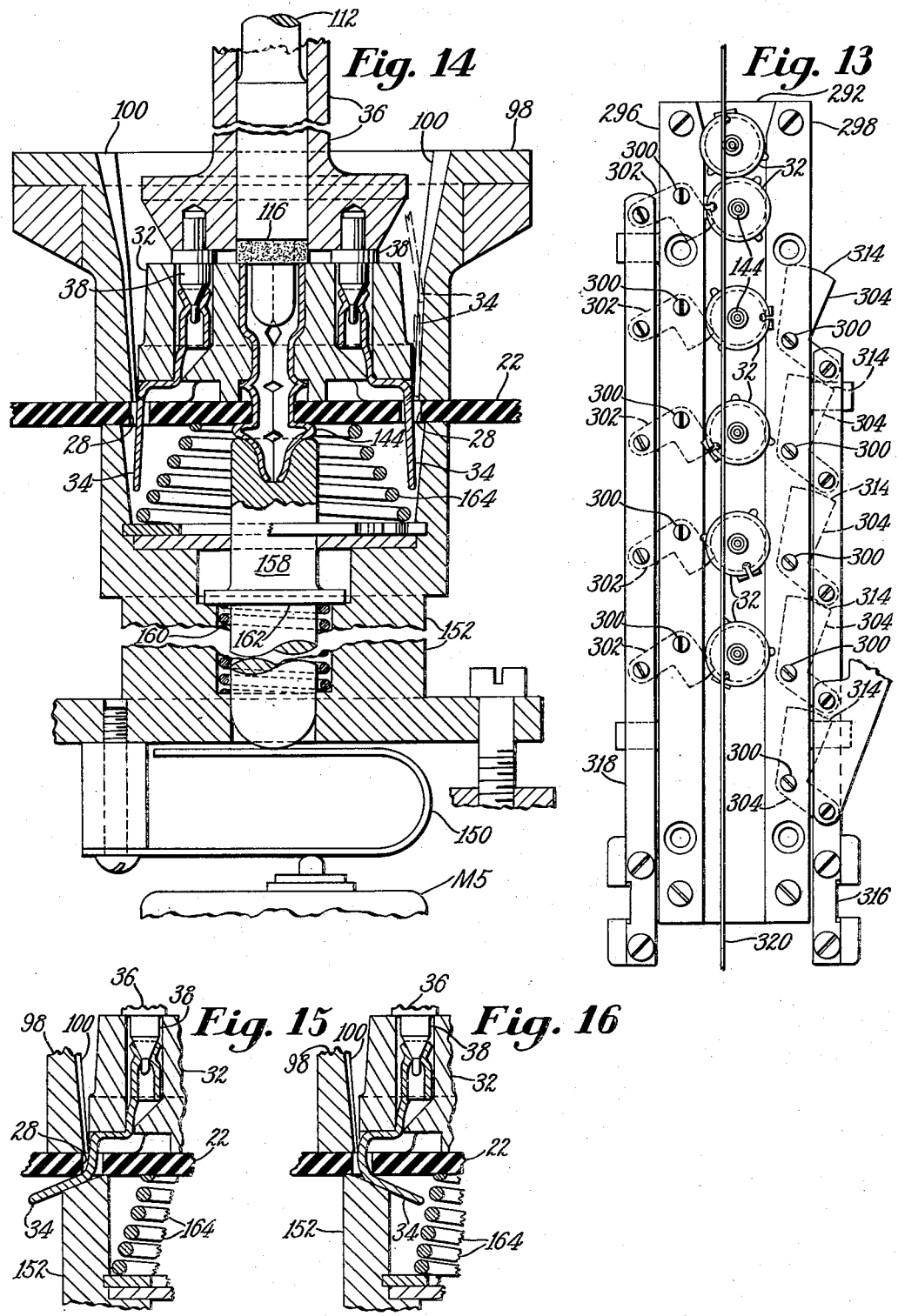

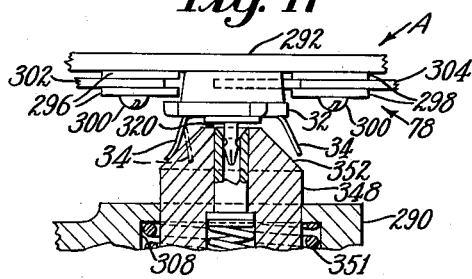
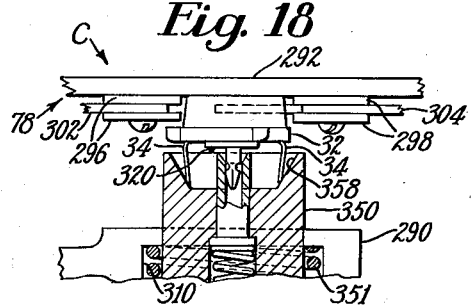
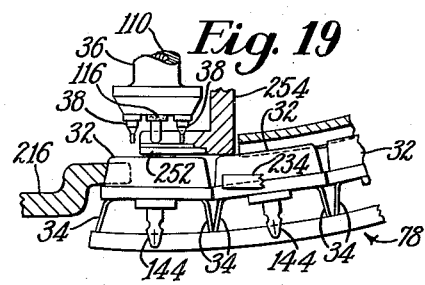
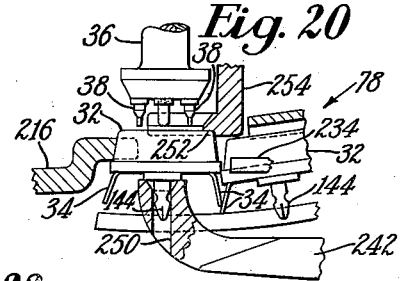
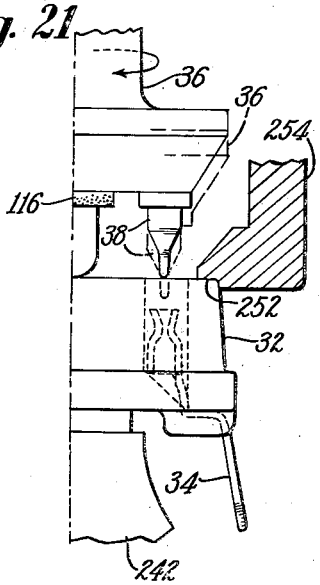
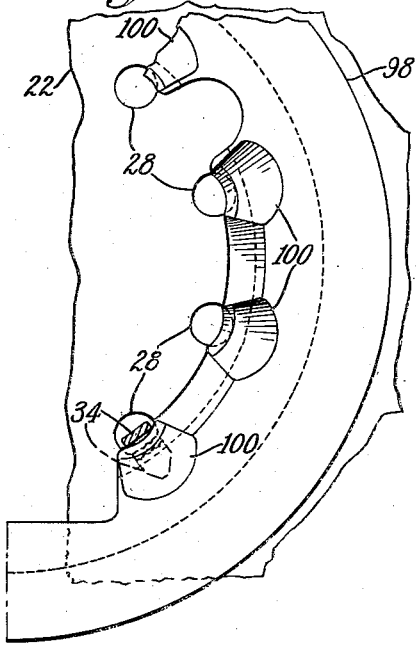

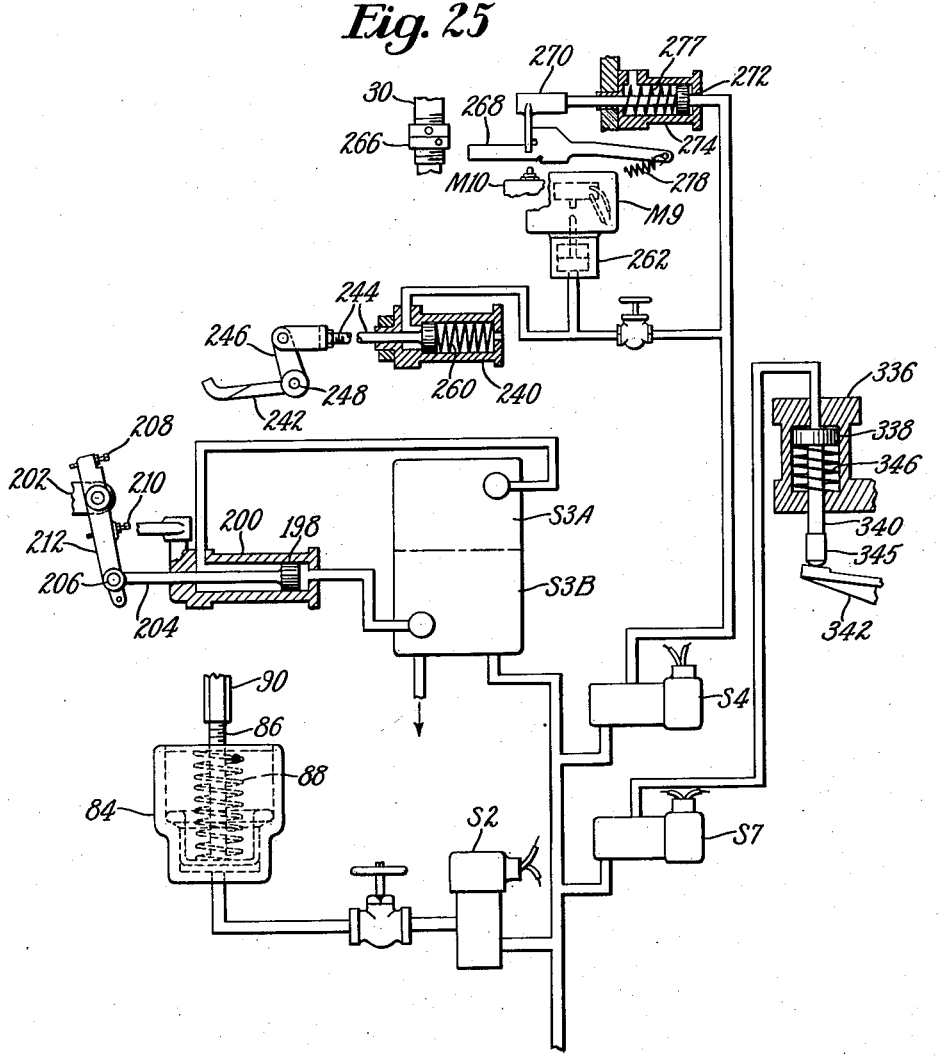

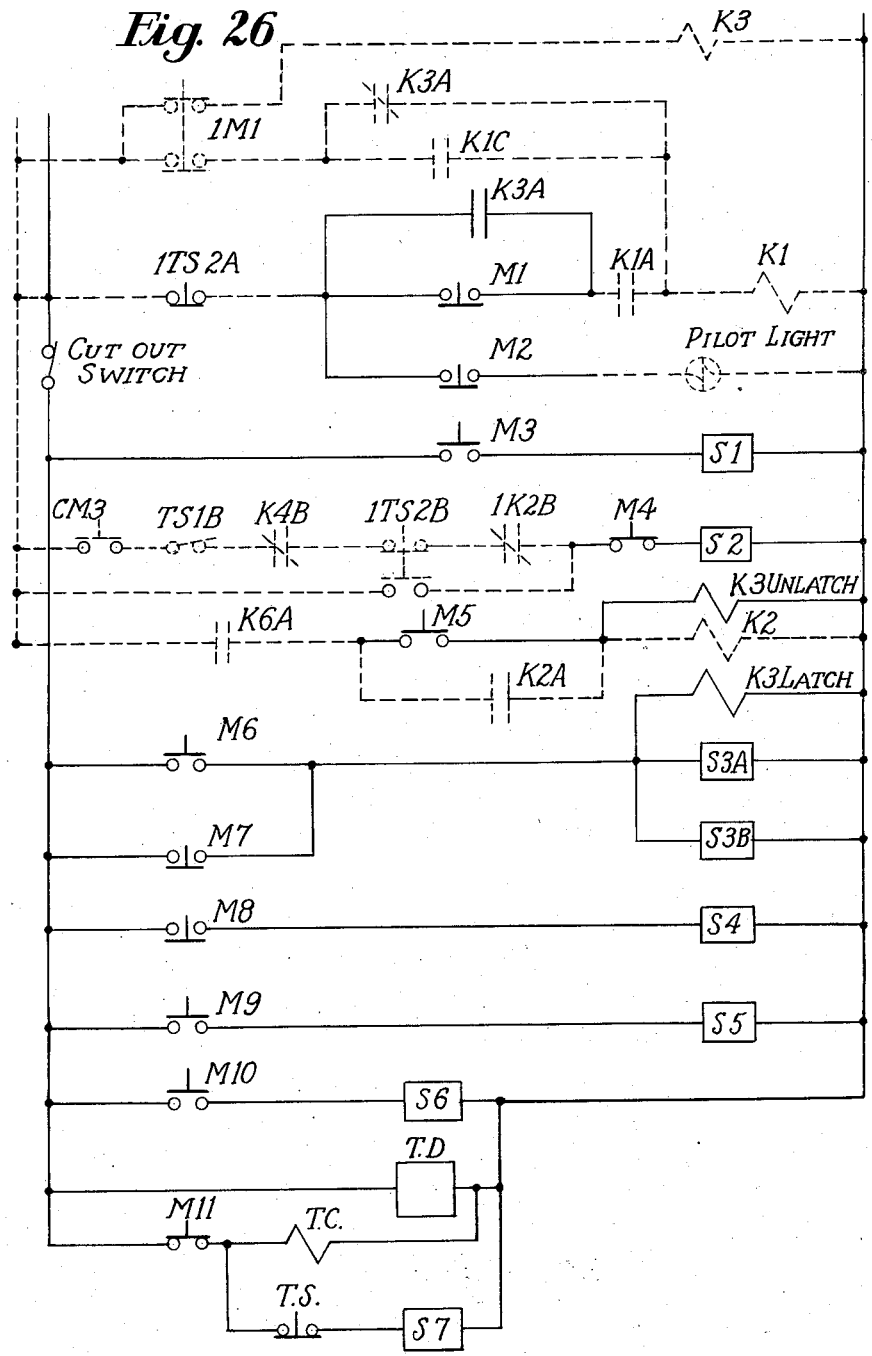

United States Patent Office 2,970,371
Patented Feb. 7, 1961

2,970,371
ARTICLE HANDLING AND INSTALLING MACHINES

Charles P. Cardani, Hamilton, Leland A. Cole, Beverly, and Andrew Eppler, Jr., Lynn, Mass., assignors to United Shoe Machinery Corporation, Flemington, N.J., a corporation of New Jersey Filed Feb. 26, 1958, Ser. No. 717,724

10 Claims. (Cl. 29—203)

This invention relates to article handling means, and is more particularly concerned with the provision of automatic equipment for precisely orienting articles in a manner such that terminal portions thereof may be registered in interlocking relation with a work support. As herein shown, the invention is concerned with providing improvements and simplification in a machine of the type disclosed in United States Letters Patent No. 2,877,541, granted March 17, 1959 on an application filed in the names of Harold W. Bishop and Basil A. Strout. Although the invention is thus illustrated and described as embodied in a machine for mounting sockets, especially electronic tube or transistor sockets which must have their resilient tabs properly oriented to be electrically connected to pre-arranged circuitry such as that found, for instance, on a printed wiring board, it will be appreciated that in several aspects application of the invention is not thus limited and may, for instance, be useful in handling container caps or the like.

Mechanical assembly of electronic components in various types of equipment has in recent years become quite common. The terminal portions of components used in large quantities, for example, the coaxial leads of resistors, capacitors, diodes, etc., are usually formed and thrust into pairs of preformed holes in wiring boards and then clinched to become connected to the appropriate wiring. As may be readily imagined, the problem of attaining the accurate insertions required is made vastly more difficult when the component to be installed, for instance a socket, has more than two, and perhaps as many as nine, resilient terminals to be simultaneously thrust into apertures correspondingly spaced to receive them. To prevent improper electrical connections from being effected, it is customary so to form a single large receiving opening or to space several receiving apertures in such a way that the multi-terminal type of component can only be mounted in the wiring board or other chassis when the terminals are correspondingly oriented and spaced for assembly in the single acceptable way. Since it is not manually feasible initially uniformly to orient the multi-terminal type commercial components and, even if it were, each must thereafter, before insertion, be oriented about an axis some variable amount dependent upon the particular circuitry and the configuration of receiving holes, the terminals should first assume known relation to their component bodies and a mounting machine must then be capable of variably orienting the bodies as required. The Bishop and Strout machine accordingly comprises, in general, a reciprocable socket mounting spindle rotatable about its axis, means for feeding successive sockets from a random mass into a position to be rotated by the spindle about its axis, means operable to cease rotation of the spindle when it has oriented a socket for register with an aperture adapted to receive it, and means thereupon effective to cause the spindle to thrust the socket into the aperture and retract therefrom.

In view of the foregoing, it is an object of this invention to provide in a machine of the Bishop et al. type improved article handling means whereby sockets or the like having terminals may successively be delivered for installation with greater certainty and in the oriented manner variably predetermined by receiving means.

To the end just stated, and in accordance with a novel feature of the invention, the illustrative machine comprises, in combination, a rotary reciprocable inserter, an inclined raceway adapted to deliver successive cylindrical articles, such as sockets or the like, into the operating path of the inserter, said articles having terminals resiliently projecting to be thrust by the inserter into prearranged terminal receiving apertures, and means mounted on the raceway for spacing for assembly the terminals of the successive articles in the course of their delivery in uniform pattern to enable the receiving apertures to accommodate them. Experience with the Bishop et al. type of machine mentioned has indicated that commercially available sockets have tabs or prongs which usually are insufficiently uniform in spacing to permit of their being directly and continuously installed with the degree of reliability normally required from machines mounted in an automatic assembly line, for example one of the type disclosed in United States Letters Patent No. 2,772,416, granted December 4, 1956, upon an application filed in the names of Adolph S. Dorosz and Thomas W. Snow. Better than 99.0% efficiency, or a failure of less than one component per 100 to be inserted, is normally an objective at each station in such lines, and the terminal spacing means afforded by this invention aids considerably in obtaining the accuracy of orientation required at a socket installing station.

In accordance with another feature of the invention, the illustrative machine includes an oscillatory raceway for delivering the successive articles with their uniformly spaced terminals into the path of the rotary inserter, means mounted for movement with the raceway and yieldable heightwise thereof for rotatably supporting each delivered article, and guide means secured on the delivery end of the raceway disposed to be engaged by the delivered article thus supported to determine its heightwise position for reception of the inserter.

The above and other features of the invention, together with various novel details of construction and combinations of parts, will now be described with more particularity in connection with an illustrative embodiment thereof and with reference to the accompanying drawings, in which Fig. 1 is a perspective view of a socket handling machine in rest position and as mounted at a socket inserting station of a conveyorized assembly line;

Fig. 7 is an exploded perspective view of means mounted on the raceway for attaining a uniform spacing for assembly of the terminals of successive sockets;

Fig. 8 is a view in front elevation of the raceway, its uniform terminal spacing means, and a socket holder operable heightwise;

Fig. 9 is a section taken on the line IX—IX of Fig. 8;

Fig. 10 is a section taken on the broken line X—X of Fig. 8;

Fig. 11 is a view in side elevation of the raceway shown in Fig. 8;

Fig. 12 is an enlarged view of socket positioning and escapement devices shown in Fig. 11 and comprising the uniform terminal spacing means;

Fig. 13 is a view corresponding to Fig. 12 and showing the position of the escapement devices when they have operated to release the lowermost socket shown in Fig. 12;

Fig. 14 is an enlarged vertical section through a socket having a center pin and showing progressively the socket terminals as inserted by the rotary spindle of the machine, the pin being clinched by anvil means but the terminals in this instance remaining unclinched;

Figs. 15 and 16 are sectional details corresponding to a portion of Fig. 14 and respectively showing optional outward and inward clinching socket terminals by modified anvils;

Figs. 17 and 18 are detail views corresponding to a portion of Fig. 9 and showing two of the terminal spacing stations in their operative positions;

Figure 1:
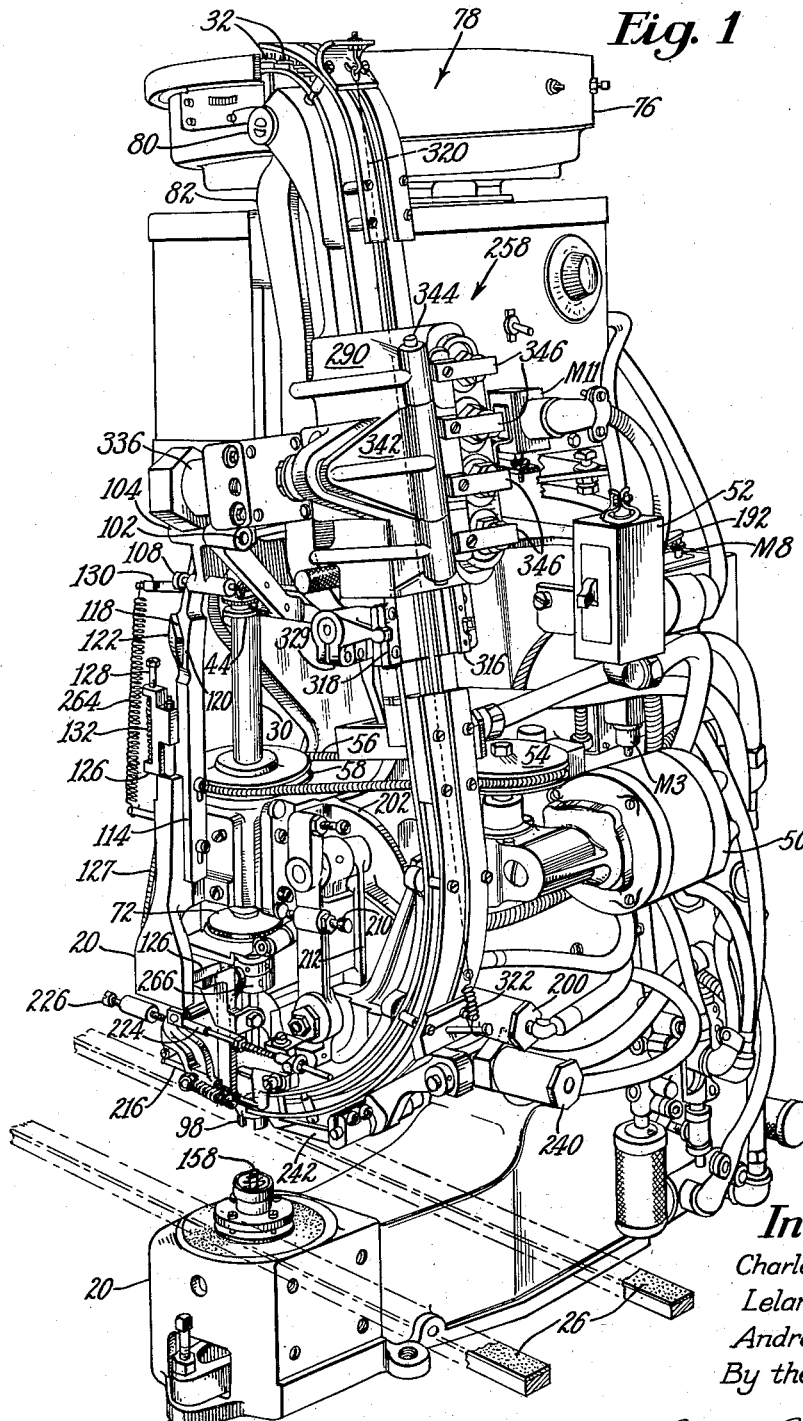
Figure 2:
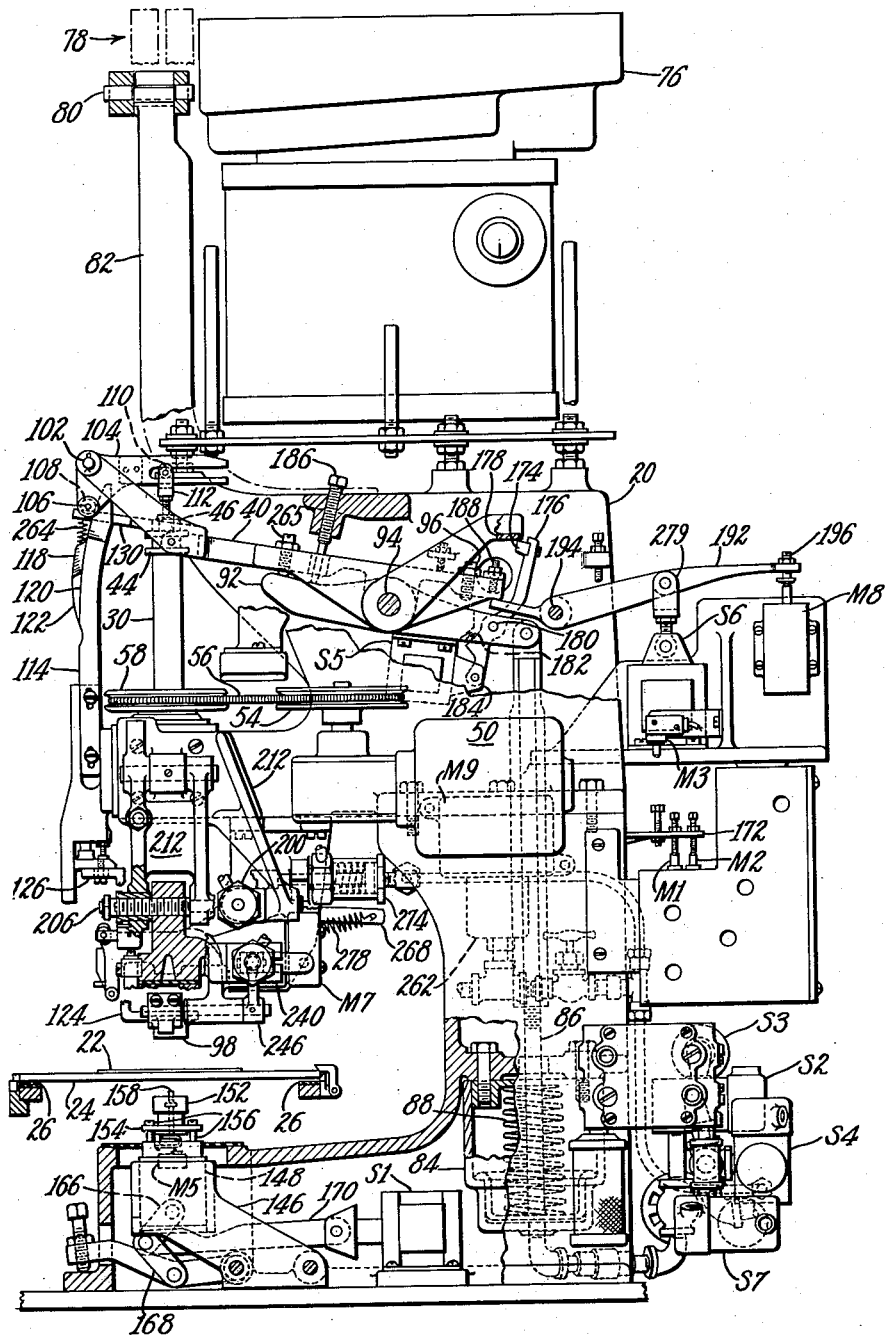
Fig. 2 is a view in side elevation of the machine shown in Fig. 1, portions of the main frame and head being broken away to reveal construction details.
Figure 23:
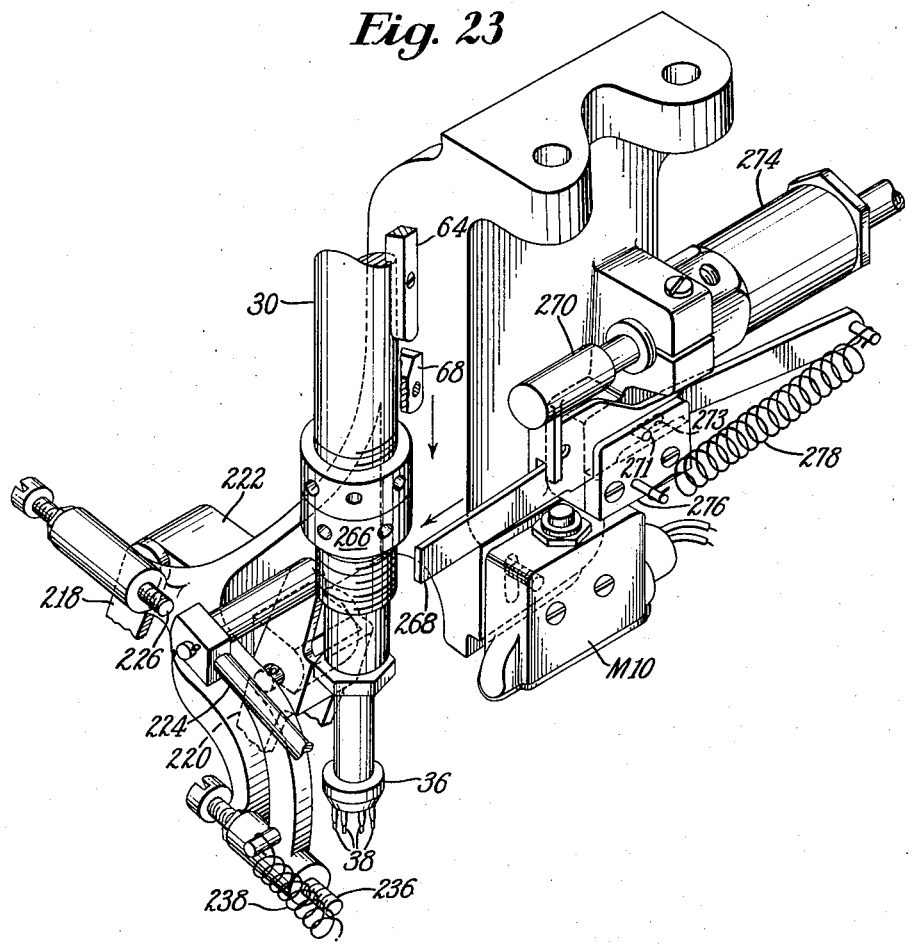
Figure 24:
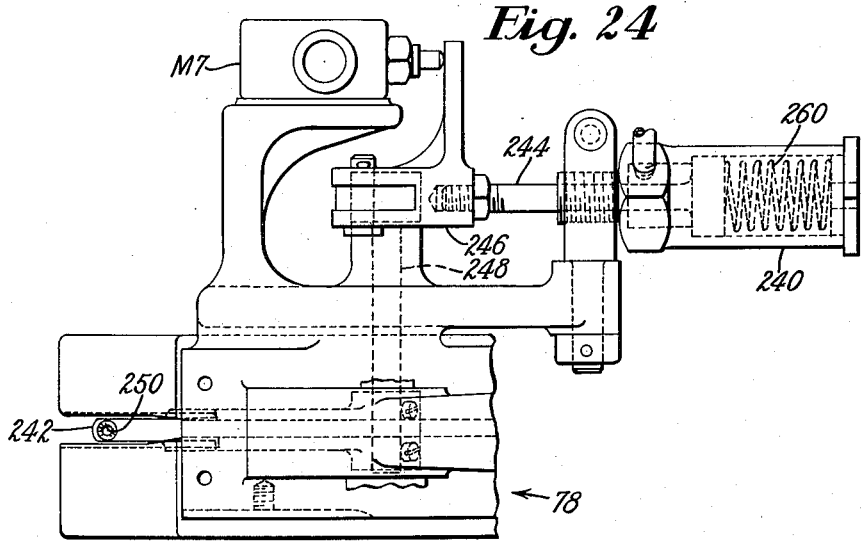

Fg. 19 is a vertical section through the delivery end of the raceway and associated parts when swung into the path of the inserting spindle, an endmost socket being released;

Fig. 20 is a view corresponding to Fig. 19 but showing the parts at a subsequent stage of operations when the released endmost socket is rotatably supported;

Fig. 21 is an enlarged detail view showing the supporting of a socket as its terminals are being hunted by the spindle;

Fig. 22 is an enlarged plan view of a portion of a wiring board adapted to receive circularly disposed socket terminals and a guide in register with the wiring board;

Fig. 23 is an enlarged perspective view of control mechanism shown in Fig. 2 and associated with the inserting spindle;

Fig. 24 is an enlarged plan view of socket holder operating means partly shown in Fig. 1;

Fig. 25 is a schematic diagram of fluid pressure control mechanism; and

Fig. 26 is a schematic wiring diagram of the electrical controls of the machine when mounted and at rest at a station of a conveyorized assembly line of the type disclosed in United States Letters Patent No. 2,772,416, dotted lines representing control circuit in the conveyor.

Unless otherwise stated herein, it will be understood that the words "terminal" or "termination" are employed in a comprehensive sense to refer not only to electrical terminals as such, but also to any terminal, projection, lead, tab, prong or the like protruding from the main body of an article to be handled by the machine. Terminals are usually slender and resilient. Hence they are easily bendable. Accordingly, they frequently are not only malformed with ordinary handling but may, in a multi-terminal type of component such as a socket, be irregularly distorted and arrayed in non-uniform configuration. It is in recognition of this practical aspect that certain of the improvements to be disclosed herein have, for example, been embodied in a machine of the Bishop and Strout type. Incidentally, for purposes of clarity in revealing mechanical details in the drawings, where a socket is shown or partially shown, only one or two of its terminals may be depicted, it being understood that other of its terminals project in generally similar manner, a common arrangement consisting of seven or nine circularly disposed terminals which may be equi-spaced except for a somewhat larger gap between one pair of adjacent terminals.

For present purposes, it will be assumed that the illustrative machine having a hollow C-frame 20 (Figs. 1–3) is at a station on a conveyorized assembly line of the type disclosed in the Dorosz et al. Patent No. 2,772,416. Accordingly, printed wiring boards 22 (Figs. 2, 5, 14 and 22) for receiving electronic components, may be detachably mounted on pallets 24 (Fig. 2) and the latter successively carried by parallel belts 26, 26 to one after another of the operating stations. By means not herein shown the pallets are disassociated from the continuously operated belts at each station and clamped to fix preformed apertures 28 (Figs. 14–16, 22) of their wiring boards in appropriate receiving position relative to a machine, for example, the illustrative socket handling machine to be described. Since the illustrative machine in many respects resembles that fully disclosed in the cited Bishop et al. application, it will suffice if those features held in common are herein explained only to the extent necessary and desirable for a full understanding of the invention.

A tubular, rotary spindle 30 (Figs. 1 and 2) for installing cylindrical articles such as sockets 32 (Figs. 10, 12, 14) in the wiring boards is mounted for heightwise movement in the overhanging, vertically bored portion of the frame 20 and controlled by mechanism to be described. Each socket 32 is provided with a plurality of resilient terminals 34 normally projecting, as herein shown, in generally circular arrangement and adapted to be received in the respective apertures 28. The terminals and apertures may, except for one, be equi-spaced, the spacing thus necessitating proper orienting of the sockets about an axis to predetermined positions as the condition precedent to insertion and securing of the terminals. A tubular socket holder 36 is detachably secured to the lower end of the spindle for rotation therewith and, unlike corresponding structures shown in the Bishop et al. application, for unyielding axial movement with the spindle. The holder is formed with registering means herein shown as depending prongs 38 arranged and adapted to be received in the tubular upper ends of the terminals within the sockets. Heightwise movement of the spindle is effected by a lever 40 (Figs. 2, 3 and 4), the front end of which is forked to carry a pair of trunnion blocks 42 (Fig. 6) received between flanges formed on a sleeve bearing 44 keyed on the spindle for rotation therewith and secured upon its reduced upper end by a nut 46.

Figure 6:
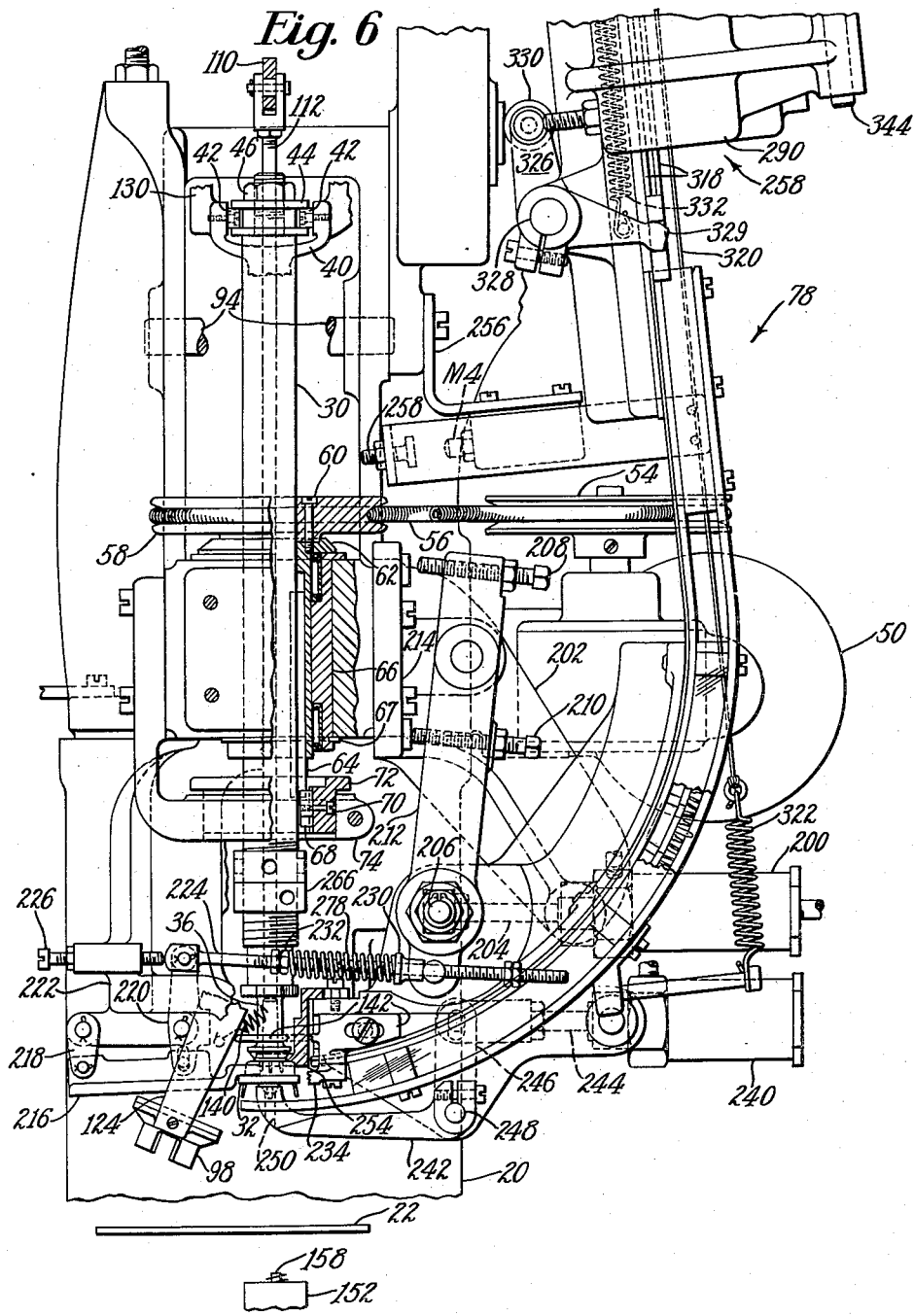
Fig. 6 is a view, partly in section and corresponding to Fig. 5, and showing the parts at a later stage in the cycle of operations.

For rotating the spindle 30 a reduction-geared motor 50 (Figs. 1 and 2) controlled by a switch 52 (Fig. 1) is mounted on the frame to drive a pulley 54 and hence, through a wire spring or slip-type belt 56, a pulley 58 on the spindle. The pulley 58 is secured by screws 60 (Fig. 6) to a sleeve 62 which is vertically slotted slidably to receive a spline 64 secured axially on the spindle. The sleeve 62 is accordingly rotatable in a sleeve bearing 66 to drive the spindle when it occupies certain heightwise positions, the bearing being supported by its flanged upper end on the frame 20 and retained against upward displacement by a snap ring 67 (Fig. 6). By the means explained in the Bishop et al. application a socket on the holder is arrested in register with the apertures 28 in a clamped wiring board. For this purpose a key 68 (Fig. 6) acts as an adjustable stop engageable by the lower end of the spline when the spindle is in normal rest position heightwise. The key is affixed by a screw 70 to a knurled annular member 72 that is normally held clamped in selected operating position in the lower split end of a bracket 74 secured to the frame. Upon engagement of the spline with the adjusted key, the prongs 38 are stopped in correctly oriented position, the spindle is axially movable, and the belt 56 is allowed to slip. The sockets 32 to be mounted are stored in random fashion in a vibratory hopper 76 (Figs. 1 and 2) above the frame 20 and conducted therefrom one by one, corresponding faces up, by an oscillatory raceway, generally designated 78, fulcrumed at its upper end at 80 (Figs. 1 and 8) to a bracket 82 secured to the frame 20. When the machine is in its rest condition as shown in Figs. 2 and 8, the raceway 78 has retracted from the path of the spindle and the latter is in a raised (but not the highest) position, having previously received and oriented an endmost socket from the raceway as will later be more particularly described.

Assuming that a pallet 24 has been clamped at the socket installing station, electrical means later explained energizes a solenoid valve S2 (Figs. 2, 25, 26) admitting air under pressure into an air motor 84 (Figs. 2 and 25). A piston rod 86 (Figs. 2, 3 and 4) of the motor is thus moved upward against the resistance of a return spring 88. The upper end of the rod is threaded into the lower end of a bar 90 pivotally connected to one end of an actuating lever 92 which is fulcrumed, in common with the spindle operating lever 40, on a pin 94 journaled in the frame 20. As a consequence, the lever 40 is shifted counterclockwise, as viewed in Fig. 2, by reason of the engagement of the lever 92 with a stud 96 threaded into the lever 40, and hence the spindle is lowered axially to thrust the socket into a funnel-shaped guide 98 (Figs. 3, 14 and 22), simultaneously lowered by means about to be explained for engagement with the board, the terminals 34 registering respectively with conical walls 100 (Fig. 14) of the guide to conduct the terminals endwise through the wiring board apertures 28.

For insuring that upon subsequent upward retraction of the spindle 30 its prongs 38 will not withdraw the just installed socket from the wiring board, holddown means has engaged the socket from above and is operable as will now be explained. A forward end of the lever 40 carries a pin 102 (Figs. 2 and 3) on which a bell crank lever 104 is pivotally supported. One arm of the lever 104 horizontally supports a spring-pressed plunger 106 (Fig. 5) carrying a roll 108, and the other arm is forked to receive a roll 110 (Figs. 2, 3 and 6) secured in the upper end of a holddown rod 112 vertically extending through the axial bore of the spindle. A cam lever 114 (Figs. 1, 3 and 5) adjustably secured on the frame is arranged to be engaged by the roll 108 during the down stroke of the spindle, and accordingly, the lever 104 will be moved clockwise, a rubber tip 116 (Fig. 14) on the lower end of the rod 112 being brought nearly to bear upon the socket as it is inserted. As the spindle descends, an angular cam surface 118 (Figs. 3 and 5) engaging the roll 108 moves the plunger 106 axially until, the socket terminals being inserted and the spindle being ready to retract, the roll 108 will have traversed a portion 120 of the lever 114 and is then shifted axially by the plunger (to the left as viewed in Fig. 5) whereupon, in the initial upward movement of the spindle, the roll 108 will be caused to pass upwardly over a cam rise 122 on the lever 114. This cam rise is effective further to swing the bell crank lever 104 (clockwise as seen in Fig. 2) to hold the tip 116 in engagement with the inserted socket until the spindle prongs 38 are fully withdrawn, the holddown rod thereafter being elevated to its upper inoperative position. The guide 98 is affixed on an arm 124 (Figs. 3 and 5) pivoted at its upper end on a composite plunger 126 slidable vertically in a front portion of the frame. For normally holding the guide 98 and the plunger 126 in raised position, a tension spring 127 (Fig. 5) has one end connected to the plunger and the other end connected to the frame. A stud 128 (Fig. 5) is vertically slidable in alined bores formed in shoulders on the plunger 126 and is disposed to be engaged endwise by an arm 130 of the lever 40 to lower the guide 98 into contact with the board 22. One end of a compression spring 132 on the stud abuts the lower shoulder and the other end abuts a nut 134 threaded on the stud. Overtravel of the arm 130 is accordingly absorbed in compression of the spring 132. A nut 136 adjustable on the stud determines the upper limit of the guide 98 by normally engaging the upper shoulder. A stop screw 138 (Fig. 5) in the plunger 126 is arranged to determine the widthwise operating position of the guide 98, a tension spring 140 connecting the arm 124 and the plunger 126 urging the arm to contact the screw 138 endwise. It will be understood that the guide is yieldingly displaced from its operating position by means of a bumper 142 adjustably secured to the raceway 78 and arranged to engage the arm 124 when the raceway swings toward the operating path of the spindle 30.

Any suitable clinching mechanism may be employed, that shown herein in Fig. 2 resembling in some respects structure described in United States Letters Patent No. 2,746,041, granted May 22, 1956 upon an application filed in the name of Roland Heeley. Fig. 14 illustrates mechanism to be described for clinching only a central pin 144 of the installed socket, and Figs. 15 and 16 depict alternate anvils for clinching other socket terminals. Referring to Fig. 2, a bracket 146 secured in the base of the frame 20 is formed with a cylindrical bore for vertically guiding an anvil holder 148. The latter internally supports an anvil switch M5 (Figs. 2, 14 and 26) arranged to be actuated by a U-shaped spring 150 having one end secured to the bottom of a tubular, cylindrical member 152 which is disposed to engage a wiring board in the vicinity of the terminal protrusions. The member 152 is secured to the holder 148 by a collar 154 and screws 156 extending therethrough. An anvil pin 158 (Fig. 14) is disposed in the member 152 to engage the pin 144 and is depressible during clinching from a normally raised position determined by a compression spring 160 until a flange 162 on the pin engages a shoulder formed in the member, at which time the pin 144 will have been radially expended or clinched against the wiring board, and the spring 150 will have actuated the switch M5. A compression spring 164 nested in the member 152 and surrounding the pin 144 aids the member 152 in bracing the wiring board against downward thrust of the guide 98 and the socket 32. For raising the member 152 into board-engaging position against the resistance of a return spring and at the proper time to cause clinching, the holder 148 is elevated by a toggle 166, 168 (Fig. 2) operated by a link 170 and a solenoid S1 (Figs. 2 and 26).

An arm 172 (Figs. 2 and 3) secured to the bar 90 carries switch operating setscrews, and accordingly in commencing the inserting stroke, switches M1 and M2 (Figs. 2 and 26) are closed, and at the end of the inserting stroke both a switch M3 (Figs. 2, 3 and 26) and then the switch M5 are closed. Clamping of the pallets 24 at their respective conveyor stations, when the conveyor control circuit is energized, had made power available to contacts 1TS2-B (Fig. 26) and the switch M5 so that the solenoid valve S2 became energized to effect the inserting stroke. Hence closure of the switch M1 holds the clamping circuit energized, and closure of the switch M2 lights a pilot light showing the spindle 30 is in down position. Closure of the switch M3 energizes the solenoid S1 to effect socket clinching, and closure of the switch M5 energizes relays K2 and K3 Unlatch (Fig. 26). The latter then opens a contact K3-A and the energized relay K2 closes a contact K2-A and opens the contact 1K2-B to deenergize the solenoid valve S2 and permit the retraction of the spindle under the influence of the return spring 88. The switch M3 reopens at the beginning of the up-stroke to deenergize the solenoid S1, and the switch M5 reopens to deenergize the relay K3 Unlatch.

Figure 3:
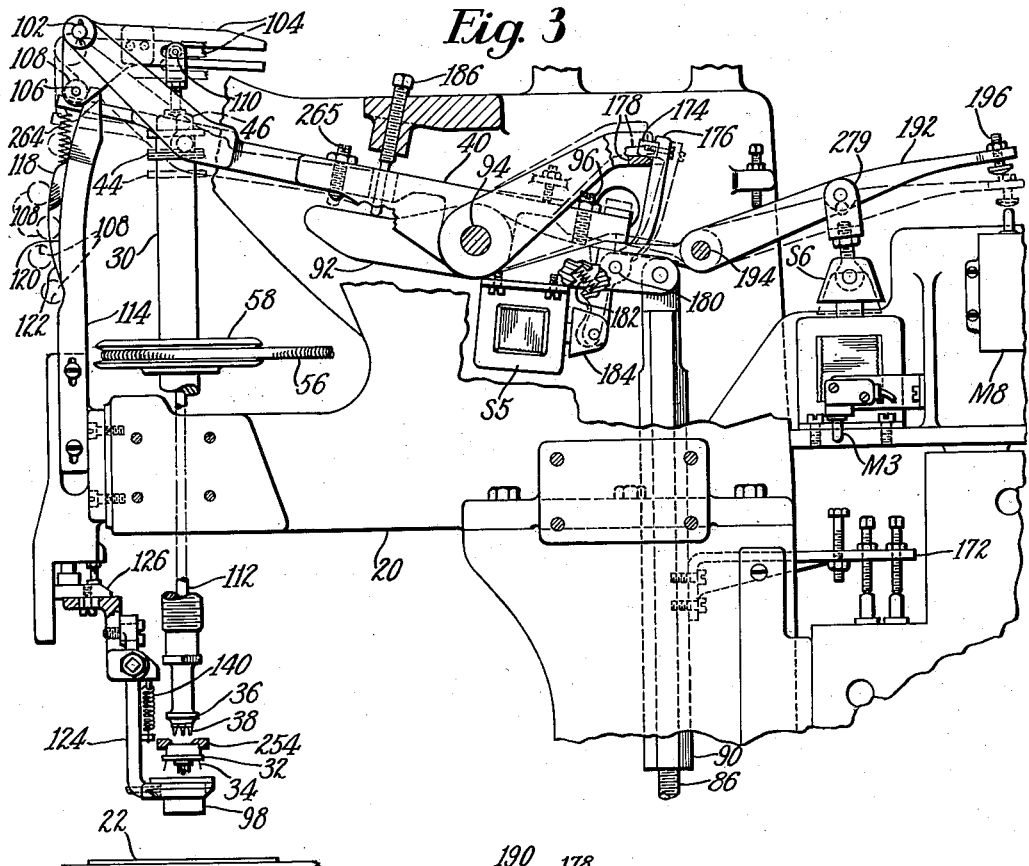
Fig. 3 is a view corresponding to a portion of Fig. 2 and showing operating linkage therein at a later stage in a cycle of operations.
Figure 4:
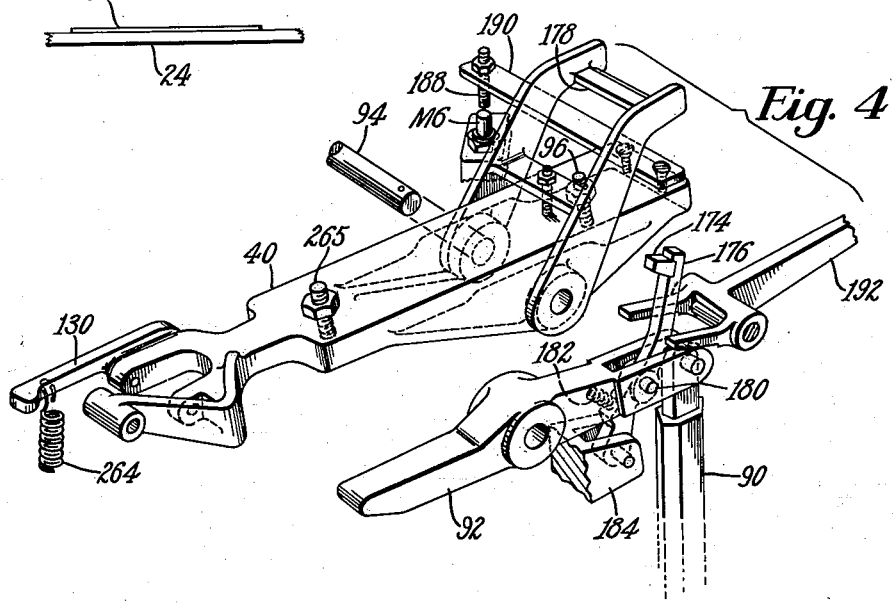
Fig. 4 is a detail view in perspective of some of the operating linkage shown in Fig. 3.

For purposes later explained, it should be noted that as the down stroke of the spindle was terminating, a latch 174 (Figs. 2, 3 and 4) on the upper end of a lever 176 assumed latching relation with a cross arm 178 at the rearward end of the spindle operating lever 40. The lever 176 is fulcrumed in the lever 92 at 180, and is urged (counterclockwise as seen in Figs. 3 and 4) into latching relation by a compression spring 182 having its ends respectively nested in the levers 92 and 176. Unlatching of the lever 176 is subsequently effected in each cycle, for a purpose later to be explained, by a solenoid S5 (Figs. 2, 3 and 26) mounted on the lever 92 and having a plunger 184 connected to the lower end of the lever 176. Upward retraction of the spindle 30 (as caused by the spring 88) proceeds to its highest point (shown in Fig. 3) determined by engagement of the lever 92 with a stud 186 threaded into the frame. At the end of this up-stroke the switches M1 and M2 are opened, the former then allowing the pallet at the socket receiving station to be unclamped for further travel and the latter switch turning off the pilot light to signal spindle retraction.

At the end of the spindle retraction a raceway operating switch M6 (Figs. 4, 5 and 26) mounted on the frame is closed by engagement therewith of an actuator 188 threaded through an arm 190 secured to the spindle operating lever 40. Simultaneously, due to engagement of the rear end of the lever 40 with one end of a lever 192 (Figs. 2, 3 and 4) fulcrumed at 194 in the frame, an actuator 196 in the other end of the lever 192 is elevated from a position shown in Fig. 2 wherein a time delay switch M8 (Figs. 2 and 26) had thus been held open to a raised position shown in Fig. 3 wherein the switch M8 will be allowed to time closed. Closure of the switch M6 energizes a relay K3 latch (Fig. 26) and raceway operating solenoid valves S3–A and S3–B (Figs. 25 and 26). The energized relay K3 closes the switch K3–A and holds the next board-carrying pallet clamped at the machine until a socket installing cycle is completed. The valves S3–A and S3–B control oscillation of the raceway 78 by actuation of a piston 198 (Figs. 10 and 25) in a cylinder 200 (Figs. 1, 6, 8 and 10) mounted on a bracket 202 adjacent to the frame. A connecting rod 204 secured at one end to the piston 198 is connected at its other end to a pin 206 rotatably mounted and extending transversely in the lower end of the raceway. The latter is accordingly shifted from its position shown in Fig. 5 to a delivery position shown in Fig. 6. (Also compare Fig. 10.) The two positions are determined, respectively, by studs 208, 210 threaded through a lever 212 fulcrumed on the bracket 202, the lever 212 being connected at one end to the raceway and each of the studs being disposed to abut a stop block 214 on the bracket 202. On energizing the valves S3–A and S3–B, therefore, the raceway carries with it an endmost socket to be picked up by the spindle 30 as will next be described, and limit switches M4 (Figs. 5, 6 and 26) and M11 (Figs. 1, 9, 11 and 26) are opened.

Figure 5:
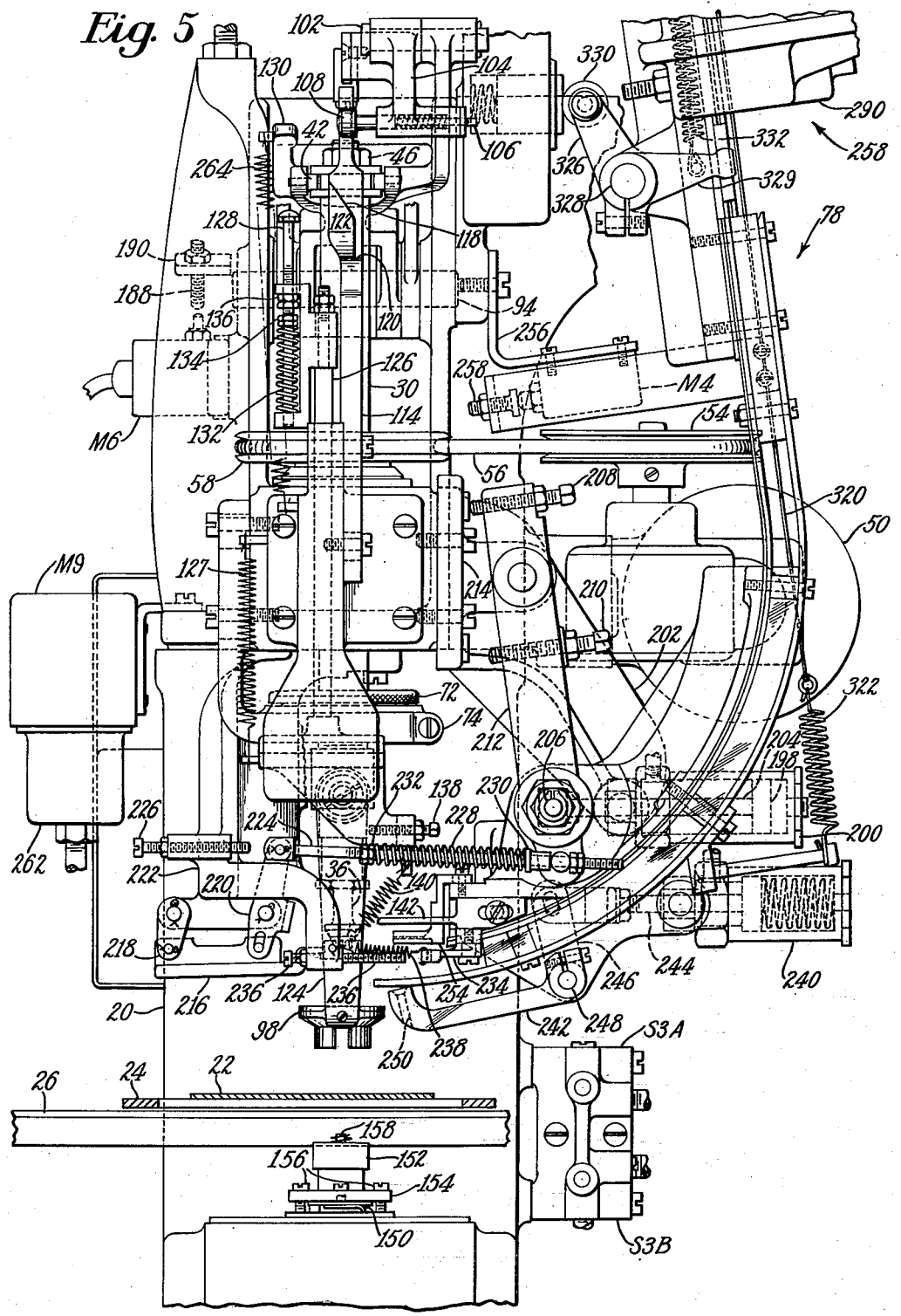
Fig. 5 is a view in front elevation showing inserting means and a raceway operable to deliver sockets successively thereto.

As the raceway delivery end moves in toward the operating path of the spindle, a socket positioning or back-up member 216 (Figs. 5, 6 and 8) is also moved in to position the socket to be transferred to the spindle. For this purpose the member 216 is carried by a link 218 and a lever 220, each pivotally mounted on a bracket 222 secured to the frame, and the lever 220 is operated by a rod 224 axially slidable in a bore formed in an ear on the lower end of the lever 212. A stop screw 226 (Figs. 5 and 6) in the bracket 222 is arranged to engage the rod 224 to limit inward movement of the member 216. The rod is yieldingly urged endwise toward the screw 226 by a spring 228 on the rod, this spring abutting endwise a collar 230 slidable on the rod as urged by the lever 212 and being backed by a nut 232 on the rod. In moving inwardly the raceway pivotally carries an escapement lever 234 (Fig. 10) one end of which is thus caused to engage a stud 236 (Figs. 5, 10 and 23) threaded into the bracket 222. Thus the lever 234 is swung (counterclockwise as viewed in Fig. 10) to an open or escape position against the resistance of a return spring 238 connecting the bracket 222 and the lever 234, and the end socket is caused, partly by reason of the momentum of the row of succeeding sockets in the raceway, to engage the back-up member 216. At this point the switch M8 times out and closes to energize a solenoid valve S4 (Figs. 25 and 26) whereupon air under pressure is admitted to a cylinder 240 (Figs. 1, 5 and 24) for lifting a socket supporting finger 242 (Figs. 1, 6, 20, 21, 24 and 25). For this purpose the cylinder 240 has swivel mounting on the raceway and a connecting rod 244 of the cylinder 240 is pivotally connected to one end of an arm 246 the other end of which is secured to a pin 248 journaled in the raceway. As shown in Figs. 5 and 6 one end of the finger 242 is adjustably clamped onto the pin 248 and the socket supporting end of the finger is adapted to engage and receive the under side of the socket engaging the member 216. In this instance the finger is accordingly formed with a partially conical bore 250 (Figs. 5 and 20) for receiving and centralizing the socket pin 144 coaxially with the operating path of the spindle 30. The end socket is accordingly lifted on the finger until (as shown in Figs. 6, 10, 20 and 21) the upper marginal surface of this socket engages a recessed surface 252 of a horseshoe-shaped bearing guide 254 adjustably mounted on the raceway, and the socket is thus rotatably supported in coaxial alinement with the spindle. It will be noted (Fig. 5) that the back-up member 216 is permitted limited heightwise movement for this purpose by reason of its pin and slot connection to the lever 220.

When the raceway 78 moves inwardly to delivery position a safety switch M4 (Figs. 5, 6, 8 and 26) supported on a bracket 256 secured to the frame is allowed to open, an actuator 258 therefore being carried by the raceway. The purpose of the switch M4 is to insure that socket insertion cannot commence until the raceway subsequently is retracted to its starting position. A switch M11 (Figs. 1, 9, 11 and 26) associated with raceway-mounted terminal spacing means 258 (Figs. 1, 7, 8, 11 and 12) as hereinafter to be described also opens as the raceway moves toward its socket delivering position. The opening of the switch M11 deenergizes a timer clutch coil TC (Fig. 26) connected into the energized line of a timing device TD and a solenoid valve S7 (Figs. 25 and 26) which controls the spacing means 258, as will be later explained.

When the energized valve S4 admitted air to the cylinder 240 to operate the finger 242, as above described, a return spring 260 (Figs. 24 and 25) in the cylinder was compressed and thereafter, the socket being held against the guide 254 by the finger 242, there ensues a pressure build-up in a cylinder 262 (Figs. 2, 5 and 25) effective to close a switch M9 (Figs. 25 and 26). The latter then energizes the spindle tripping solenoid S5 (Figs. 2, 3 and 26) which acts through its plunger 184 to swing the lever 176 clockwise as viewed in Fig. 3, thus unlatching it and allowing the rotating spindle 30 to drop under the influence of gravity and a light spring 264 (Figs. 1, 4 and 5) secured to the arm 130. The prongs 38 of the holder 36 accordingly rotate on top of the supported socket, "hunting" the tubular upper ends of the terminals within the socket and "finding" them, i.e. the several prongs rotate to the single position in which they are in register with the terminals, and the spindle 30 then further falls (about ⅛") as the prongs descend into the socket holes of the respective terminals. Fig. 21 illustrates the hunting position in full lines and depicts in dotted lines the dropping of the prongs into the respective terminals. The extent of prong penetration is adjustably determined by a setscrew 265 (Figs. 3 and 4) and corresponds to the gap between it and the lever 92 as shown in Fig. 3. Preferably the prongs are tapered as shown to facilitate their being centralized in the socket holes and thus enabling the prongs to be inserted within the upper ends of the terminals. The specific shape of the prongs 38 found most effective has an upper cylindrical portion, an intermediate conical portion, and a depending, much smaller-diametered cylindrical portion which is coaxial and thus adapted to avoid snagging on the contact 34. Prong insertion as assured by the bottle-shaped prongs 38 is an important feature since without it a terminal may only be forced askew and a requisite electrical connection of a terminal 34 with printed wiring on the board 22 may thereby be prevented. As soon as the prongs 38 descend into the socket holes the spline 64 is engageable with the key 68 and accordingly the socket is rotated 360° or less, as predetermined to be appropriate, before being arrested in register with the receiving apertures of the wiring board.

Descent of the spindle 30 when the prongs 38 have found their socket holes is also effective to close a switch M10 (Figs. 23, 25 and 26) by means now to be described, the switch M10 then energizing a spindle-drive-solenoid S6 (Figs. 2, 3 and 26). A collar 266 (Figs. 1, 6 and 23) threaded on the spindle is arranged, when a lever 268 (Fig. 23) is permitted by a plunger 270 to be moved forward, to depress the lever 268 about a pivot pin 27 therein, this pin acting as a slidable fulcrum and extending in a horizontal slot 273 of a supporting bracket 276 on the frame. A tension spring 278 connecting the bracket and the rearward end of the lever 268 urges the latter forwardly into engagement with the plunger 270, the position of which is determined by a piston 272 (Fig. 25) in a cylinder 274 (Figs. 23 and 25) mounted on the frame. Accordingly, as the energized valve S4 raises the socket lifting finger 242 as described to support the socket, air is admitted under pressure to the cylinder 274 and the plunger 270 is displaced against resistance of a return spring 277 (Fig. 25) to permit the lever 268 by engagement therewith of the collar 266 to close the switch M10. The energized solenoid S6 is connected by a plunger 279 to the lever 192 (Figs. 2, 3 and 4) pivotally mounted in the frame at 194. Consequently the lever 192 is moved clockwise as viewed in Fig. 3 and the front end of the lever engages and moves upwardly the rear end of the lever 40 to drive the spindle prongs 38 downwardly into the supported socket terminals.

At this stage in the cycle of the machine the raceway operating switch M6 opens due to disengagement therewith of the actuator 188, and the rear end of the lever 192 has descended to open the switch M8 and thus deenergize the solenoid valve S4. Accordingly, the socket supporting end of the finger 242 drops downwardly, free from the socket (which is now carried by the prongs 38) as urged by the return spring 260 (Fig. 24) in the cylinder 240, and an interlock switch M7 (Figs. 24 and 26) secured on the raceway is thereafter opened due to relative movement of the arm 246 thereby deenergizing the valves S3A and S3B. (The function of the switch M7 is to insure that the raceway cannot retract until the finger 242 drops.) The raceway 78 is thus caused to swing outwardly to its starting position to close the switch M4. A pallet 24 having been clamped to support its wiring board in socket receiving position on the conveyor, the solenoid S2 is energized and then operates as above explained to cause the spindle 30 to descend to its lower limit to install the socket.

While the raceway is in its outward position, the means 258, which normally is essential to insure continuous and effective article handling by the machine, functions uniformly to space the terminals of successive sockets as will now be explained. The switch M11 (Figs. 1 and 11) is mounted on a casting 290 (Figs. 1, 7, 8, 9 and 11) comprising an upper and inner track portion of the raceway. An outer complemental track portion 292 (Figs. 7 and 13) is secured by screws 294 to the casting 290, and spaced guides 296, 298 secured by screws 300 to the track portion 292 are adapted to provide a straight path for the row of sockets, the inner edges of the guides being slidably engaged by the peripheries of the socket bodies. The screws 300 in the guideways 296 respectively serve as pivots for a plurality of socket holding detents 302 (Figs. 9 and 11 to 13), and the screws 300 in the guides 298, staggered heightwise of the screws 300 in the guides 296, respectively act as pivots for a plurality of socket positioning levers 304.

The purpose of the latter is to axially aline a series of sockets, in this instance four, in the raceway with a series of terminal spacing stations designated A, B, C and D (Figs. 7, 8, 9 and 11), respectively, which are operative in bores 306, 308, 310 and 312 (Fig. 7) formed in the casting 290. Each lever 304 has an arcuate inner end 314 adapted to engage a socket periphery to position it cooperatively with the guide 296 for coaxial register with the mentioned bores (as shown in Fig. 12) and an outer end pivotally secured to parallel operating links 316. In like manner the detents 302 are arranged to alternate with the levers 304 in engaging the successive sockets (as shown in Fig. 13) to permit them to progress step-by-step through the spacing-for-assembly means, the outer ends of the detents being operatively connected to parallel links 318. For slidably retaining the sockets in the raceway and providing a minimum of resistance to their feeding movement, as effected by gravity and assisted by vibration due to operation of the linkage, a wire 320 (Figs. 1, 5, 8, 9 and 12) is secured at its upper end to a hook bracketed on the raceway and is secured at its lower end to a tension spring 322 anchored to the raceway. For operating the links 316, 318 to swing the detents 302 into socket engaging position as the levers 304 are swung out of a socket engaging position (and vice versa), the lower ends of the links 316 are slotted to receive an arm 324 (Figs. 7 and 9) of a bell crank lever 326 pivotally mounted on a pin 328 (Figs. 6 to 8) journaled in the raceway, and the lower ends of the links 318 receive an arm 329 secured on the pin 328. A roll 330 carried by the crank 326 is yieldingly held in engagement with a hardened face on the bracket 82 by a spring 332 (Figs. 5 to 7). For actuating the switch M11 a setscrew 334 (Figs. 7 and 11) is threadedly carried in an arm secured to one of the links 316.

As indicated in Fig. 11 the construction and arrangement of the spacing means 258 is such that as the raceway assumes its outward position, the ends 314 position the sockets and the switch M11 is closed by engagement therewith of the screw 334 to energize the timer clutch TC and the solenoid valve S7 through a timing switch TS (Fig. 26). The valve S7 (Fig. 25) is thereupon effective to admit air under pressure to a cylinder 336 (Figs. 9 and 25) having a piston 338 and a connecting rod 340. Accordingly one end of a rocker 342 hinged by a pin 344 (Figs. 7 and 9) to the casting 290 is caused to be engaged by a striker 345 threaded on the connecting rod 340 and is displaced against resistance of a return spring 346 in the cylinder. Four depresser bars 346 (Figs. 7 and 11) carried by the rocker are consequently forced respectively to operate terminal bending tools, herein shown as three terminal spreaders 348 (Figs. 7 and 17) and a terminal spacer 350 (Figs. 7 and 18) axially in the corresponding bores 306, 308, 310 and 312, against the resistance of return springs 351 nested in the casting 290. The terminals of the four sockets positioned coaxially of these bores are thereby subjected to bending, if need be, by conical end formations of the spreader and spacer. Preferably, and as herein shown in Fig. 7, two initial formations 352, 354 and a final one designated 356 are externally conical to effect outward spreading of the terminals, and a single formation 358 (Fig. 18) on the spacer 350 is internally conical to insure that all terminals are spaced within the pattern finally determined by the formation 356. Each socket delivered by the raceway will thus have been given four progressive treatments to insure uniformity of their terminal patterns and conformity with requirements of the configuration of the receiving holes in the wiring boards. When the spreaders and spacer have acted on the socket terminals for a predetermined interval the timer switch TS opens to deenergize the valve S7 and permit their return to inoperative position. Terminal patterning is accordingly effected in the intervals when the raceway 78 is not delivering a socket to the inserter, each socket proceeding from station A to station B, from B to C, and from C to D, and ultimately to the finger 242 and then to the inserting spindle 30.

It is believed that the cycle of the machine will be understood from the foregoing description as made concurrently with explanation of its structure. The uniform spacing of terminals as sockets proceed down the raceway 78, coupled with effective means for transferring the successive sockets from the raceway to the spindle, assure continuous and effective operation of the automatic machine with little or no attention from an operator.

Having thus described our invention, what we claim as new and desire to secure by Letters Patent of the United States is:

1. In a machine of the type having a reciprocable inserter for installing resilient terminals of articles in predetermined arrangement, a frame, a raceway movably mounted on the frame and adapted to deliver the articles successively into the path of the inserter for transfer thereto, mechanism for moving the raceway toward and from its delivery position in time relation to the operating strokes of the inserter, and means mounted on the raceway and controlled by said mechanism for uniformly spacing for assembly the terminals of successive articles, respectively, preparatory to their transfer and installation according to said arrangement.

2. A machine as set forth in claim 1, and further characterized in that said terminal spacing means comprises a series of spaced tools movable to engage the terminals of the successive articles, and means for successively positioning articles in the raceway in register with the paths of the tools respectively.

3. In a machine for handling sockets respectively having a plurality of resilient connective terminals, raceway means for delivering the sockets successively from a random mass and with their terminals extending in the same general direction, and means mounted on the raceway for uniformly spacing for assembly the terminals of successive sockets therein, said spacing means comprising a terminal engaging and deflecting device movable toward and from the raceway and axially of a socket therein, and mechanism for positioning the successive sockets axially of said device.

4. A machine as set forth in claim 3, and further characterized in that means is provided for oscillating the raceway to deliver an endmost socket therefrom and then retract, and mechanism operatively connected to the raceway is arranged to control actuation of the device and said positioning means.

5. A machine as set forth in claim 3, and further characterized in that said device consists of a series of terminal spacing stations each of which includes a plunger having a conical end formation, at least one of the formations being internally disposed and at least one other of said formations being externally disposed whereby the series of stations produce uniformly spaced terminals.

6. In a machine for handling sockets or the like having terminals extending from corresponding faces thereof, a frame, a reciprocable inserter mounted thereon, an oscillatory raceway secured on the frame and having a passageway arranged and adapted to conduct the sockets in row formation to a delivery end, means for swinging the raceway to cause an endmost socket to be delivered into the path of the inserter, a series of terminal spacing means spaced along the raceway to deflect the terminals of several sockets relatively to their bodies, respectively and simultaneously, and mechanism responsive to the oscillations of the raceway for effectively positioning successive series of the sockets relatively to the terminal spacing means each time the endmost socket is installed by the inserter.

7. A machine for installing articles comprising a frame, a reciprocable inserter mounted thereon, means for moving the inserter to and from a work piece adapted to receive the articles, an oscillatory raceway mounted on the frame for delivering the articles successively into the path of the inserter, an article supporting finger movably mounted on the delivery end of the raceway, a bearing guide mounted on the raceway above said finger, the finger being formed to lift an endmost article from the raceway and cooperate with the bearing guide in positioning the article for reception of the inserter, means for oscillating the raceway in time relation to installing strokes of the inserter, and means for operating said finger in time relation to the oscillations of the raceway to present and transfer the successive articles to the inserter.

8. A machine as set forth in claim 7, and further characterized in that the raceway oscillating means is controlled by a circuit including an interlock switch, and the finger operating means is arranged to actuate the interlock switch to prevent operation of the raceway while the finger is supporting the article.

9. A machine as set forth in claim 7, and further characterized in that a member is mounted on the other side of the inserter from the raceway and for reciprocation transversely of the path of the inserter axially to aline an endmost article therewith, said member having operative connection with the raceway and being movable heightwise with the finger in cooperatively locating the article against said bearing guide.

10. A machine as set forth in claim 7, and further characterized in that an annular terminal guide for axially receiving the inserter is mounted on the frame for yielding engagement with the work piece and adapted to funnel the terminals of an article on the inserter into the work piece, said terminal guide normally being alined with the path of the inserter and displaceable therefrom by the raceway to permit transfer therefrom of a socket to be installed by the inserter.

References Cited in the file of this patent
UNITED STATES PATENTS

| | | |
|---|---|---|
| 1,829,651 | Henderson | Oct. 27, 1931 |
| 2,155,958 | Schmidt | Apr. 25, 1939 |
| 2,340,360 | Alden | Feb. 1, 1944 |
| 2,545,756 | Andren | Mar. 20, 1951 |
| 2,794,563 | Daines | June 4, 1957 |